3,528,887
SYNTHESIS OF L-ASPARAGINASE
Robert S. Robison, North Brunswick, N.J., assignor to
E. R. Squibb & Sons, Inc., New York, N.Y., a corporation of Delaware
No Drawing. Filed Feb. 1, 1968, Ser. No. 702,172
Int. Cl. C12d 13/10
U.S. Cl. 195—66                4 Claims

---

ABSTRACT OF THE DISCLOSURE

This invention relates to a new and improved process for preparing the enzyme L-asparaginase. In accordance with the process of this invention, L-asparaginase is obtained in increased yields from cells of *Escherichia coli* grown in a fermentation medium containing glycerol.

---

This invention relates to a new and improved process for preparing the known enzyme L-asparaginase. Prior to this invention, L-asparaginase was liberated from cells of *Escherichia coli* (*E. coli*) grown in a medium having the following composition: 3.0% of a pancreatic digest of casein, 0.7% of a pancreatic digest of soybean meal, 0.25% glucose hydrate, 0.5% sodium chloride, 0.25% dipotassium phosphate, the remainder comprising tap water.

In the process of this invention inocula is prepared by adding 0.25 to 1 ml. of a cell suspension of *E. coli* to 50 ml. of sterile medium in 250 ml. Erhlenmeyer flasks. The inoculated flasks are then incubated at 25–37° C. on a rotary shaker for 20 to 24 hours.

0.5% by volume of the above inocula is then aseptically transferred to any desired volume of sterile media. Fermentation is carried out at 25–37° C. for 18 to 24 hours with agitation, after which the cells are recovered and assayed for L-asparaginase.

To recover the L-asparaginase produced by the above fermentation, the cell suspension is centrifuged at 3 to 8° C. to obtain a cell paste which is suspended in a 0.001 M pH 8.0 phosphate buffer solution or in tap water and subjected to sonic disruption for five minutes at −15 to −5° C.

The disrupted cell suspension containing the desired enzyme is centrifuged and the thus clarified supernatant is assayed at a pH of 5.0 for in vivo active L-asparaginase in accordance with the method disclosed by Campbell et al., Biochemistry, vol. 6, No. 3, March 1967, pp 721–730.

While fermentation employing the above medium results in the production of usable amounts of L-asparaginase, the yield leaves something to be desired. It has now been unexpectedly discovered that yields of L-asparaginase may be significantly increased by substitution of glycerol for the glucose hydrate in the above reaction medium.

The amounts of glycerol which may be employed in the fermentation medium in accordance with this invention may range from about .01% by weight to about 0.75% by weight. Preferably the amounts of glycerol employed will be in the range 0.01 to 0.5% by weight based on the fermentation medium.

The following examples will illustrate the invention:

EXAMPLE I

(A) Test media

A medium having the following composition is prepared.

| Material: | Percent |
|---|---|
| Pancreatic digest of casein | 3.00 |
| Pancreatic digest of soybean meal | 0.70 |
| Sodium chloride | 0.50 |
| Dipotassium phosphate | 0.25 |
| Tap water, 1000 ml. | |

To prepare test media, one of the following is added to the above basic medium: (a) 0.25% glucose hydrate, (b) a combination of 0.25% glucose hydrate and 0.25% glycerol, and (c) 0.15, 0.25, 0.50, or 1.0% glycerol. The media are then sterilized for 30 minutes at a temperature of 120° C. and 15 pounds of steam pressure.

(B) The fermentation

The growth of *E. coli* B (ATCC 9637) on agar medium contained in a test tube is suspended in 10 ml. of a sterile 0.01% Duponol solution. The resulting cell suspension is used to inoculate a flask containing 50 ml. of a sterilized medium having the following composition: 3.0% of a pancreatic digest of casein, 0.7% of a pancreatic digest of soybean meal, 0.25% glucose hydrate, 0.5% sodium chloride, 0.25% dipotassium phosphate, the remainder comprising tap water. This mixture is incubated at 33° C. on a rotary shaker with a two-inch stroke and a speed of 240 r.p.m. for 18 hours. Four 250 ml. Erhlenmeyer flasks, each containing 50 ml. of sterile test medium, are each inoculated with 0.25 ml. of the 18-hour old inoculum. These flasks are placed on the above rotary shaker at 37° C. for 20 hours, the resulting cell suspension is centrifuged at 0 to 5° C. and the supernatant discarded. The resulting cell paste is suspended in 11 ml. of a 0.02 M pH 8.0 phosphate buffer solution and subjected for five minutes at −15 to −5° C. to sonic disruption in a Bronson Sonifier (Model S-110) operating at 110 watts and producing sound waves of 20 kc./sec. The disrupted cell suspension so obtained is then clarified by centrifugation at 0.5° C., the cell paste discarded and the supernatant is assayed at a pH of 5.0 for in vivo active L-asparaginase content in accordance with the procedure set forth by Campbell et al. supra.

During the process of fermentation, it may be desirable to add anti-foaming agents, such as polypropylene glycol, lard oil, or the like. These agents may be added from time to time in amounts required to control foaming.

The results of carrying out the above fermentation in various test media with and without glucose hydrate and with varying percentages of glycerol are set forth in the table below.

TABLE I

| Glycerol, percent | Glucose hydrate, percent | Assay, IU/ml. | Change in synthesis, percent |
|---|---|---|---|
| 0 | 0.25 | 0.90 | Control |
| 0.15 | 0 | 1.62 | +78 |
| 0.25 | 0 | 1.51 | +67 |
| 0.50 | 0 | 1.21 | +33 |
| 1.0 | 0 | 0.86 | −5.3 |
| 0.25 | 0.25 | 0.90 | 0 |

EXAMPLE II

In a parallel experiment, following the same procedure as set forth in Example I, except for the amounts of glycerol employed, results are obtained as set forth below:

TABLE II.—EFFECT OF GLYCEROL ON L-ASPARAGINASE SYNTHESIS

| Glycerol, percent | Glucose, percent | Assay, IU/ml. | Change, percent control |
|---|---|---|---|
| 0 | 0.25 | 1.01 | Control |
| 0 | 0 | 0.73 | −28 |
| .01 | 0 | 1.45 | +42 |
| .05 | 0 | 1.40 | +40 |
| .10 | 0 | 1.46 | +44 |
| .15 | 0 | 1.45 | +42 |
| .25 | 0 | 1.21 | +20 |
| 1.0 | 0 | 0.83 | −14.7 |

From the above tables it can be seen that the use of small amounts of glycerol in place of glucose hydrate in the reaction medium results in significant increases in the amount of L-asparaginase produced by the fermentation. Table I also illustrates that adding a small amount of glycerol in addition to the glucose hydrate results in no advantage and Table II, that the use of neither results in a significant loss in L-asparaginase yield.

What is claimed is:

1. In the fermentation of *Escherichia coli* to produce L-asparaginase, the improvement which comprises employing a fermentation medium containing about 0.01% by weight to about 0.75% by weight of glycerol.
2. The process of claim 1 wherein the *Escherichia coli* is *Escherichia coli* B.
3. The process of claim 1 wherein the fermentation medium comprises a mixture of a pancreatic digest of casein, a pancreatic digest of soybean meal, glycerol, sodium chloride, dipotassium phosphate, and water.
4. The process of claim 1 in which the fermentation is carried out with agitation at a temperature in the range of 25 to 37° C.

References Cited

UNITED STATES PATENTS 3,440,142   4/1969   Teller _____ 195—66

OTHER REFERENCES

Heinemann et al.: Applied Microbiology, vol. 18, pp. 550–554, October 1969.

LIONEL M. SHAPIRO, Primary Examiner